United States Patent
Schaefer et al.

(10) Patent No.: US 6,823,584 B2
(45) Date of Patent: Nov. 30, 2004

(54) PROCESS FOR MANUFACTURING A MEMBRANE ELECTRODE ASSEMBLY

(75) Inventors: Joachim R. Schaefer, Esslingen (DE); Martin Schroer, Buxtehude (DE)

(73) Assignee: Ballard Power Systems Inc., Burnaby (CA)

(*) Notice: Subject to any disclaimer, the term of this patent is extended or adjusted under 35 U.S.C. 154(b) by 104 days.

(21) Appl. No.: 10/137,506

(22) Filed: Apr. 30, 2002

(65) Prior Publication Data

US 2002/0192548 A1 Dec. 19, 2002

Related U.S. Application Data

(60) Provisional application No. 60/302,262, filed on Jun. 29, 2001, and provisional application No. 60/288,351, filed on May 3, 2001.

(51) Int. Cl.[7] .......................... H01R 43/00; H01M 4/02
(52) U.S. Cl. .............................. 29/825; 29/846; 29/851; 29/853; 29/861; 429/209
(58) Field of Search .................. 29/846, 851, 853, 29/861, 825; 156/324, 308.2, 309.6, 309.9, 320, 322, 583.5, 308.1; 205/80; 429/209

(56) References Cited

U.S. PATENT DOCUMENTS

| | | | | |
|---|---|---|---|---|
| 3,852,387 A | * | 12/1974 | Bortnick et al. | 264/40.5 |
| 4,311,550 A | * | 1/1982 | Kerttula | 156/555 |
| 5,258,085 A | * | 11/1993 | Breitscheidel et al. | 156/148 |
| 5,384,217 A | * | 1/1995 | Binder et al. | 429/225 |
| 5,498,639 A | * | 3/1996 | Wei et al. | 521/27 |
| 5,602,185 A | * | 2/1997 | Stone et al. | 521/27 |
| 5,672,439 A | * | 9/1997 | Wilkinson et al. | 429/40 |
| 5,684,192 A | * | 11/1997 | Stone et al. | 562/826 |
| 5,693,202 A | * | 12/1997 | Gestermann et al. | 204/265 |

(List continued on next page.)

FOREIGN PATENT DOCUMENTS

| | | | |
|---|---|---|---|
| EP | 1052715 | * | 11/2000 |
| JP | 60-165046 | * | 8/1985 |
| JP | 60-089717 | * | 3/1994 |
| JP | 08-264176 | * | 10/1996 |
| JP | 08-298123 | * | 11/1996 |
| JP | 10-006126 | * | 1/1998 |
| JP | 10-064527 | * | 3/1998 |
| JP | 10-069905 | | 3/1998 |
| JP | 10-069905 | * | 3/1999 |
| JP | 11-138327 | * | 5/1999 |
| JP | 11-144713 | * | 5/1999 |
| JP | 11-288708 | * | 10/1999 |
| JP | 11-297314 | * | 10/1999 |
| JP | 11-339786 | * | 12/1999 |
| JP | 2000-100422 | * | 4/2000 |
| JP | 1052715 | | 11/2000 |
| WO | WO 97/23919 | | 7/1997 |
| WO | WO 00/51806 | | 9/2000 |
| WO | WO 01/61774 | | 8/2001 |
| WO | WO 01/98047 | | 12/2001 |

*Primary Examiner*—Carl J. Arbes
*Assistant Examiner*—Tai Nguyen
(74) *Attorney, Agent, or Firm*—McAndrews, Held & Malloy, Ltd.

(57) ABSTRACT

A process for manufacturing a membrane electrode assembly for an electrochemical cell comprises: feeding a sheet of ion exchange membrane material through a double belt press; feeding at least one electrode substrate through the double belt press; and applying heat and pressure to bond a portion of the membrane material and the electrode substrate within a process zone of the double belt press. An apparatus for manufacturing membrane electrode assemblies for an electrochemical cell comprises a double belt press. The present process can further comprise cutting a membrane electrode assembly, such as by longitudinal slitting to obtain strips of the desired width and/or cross-cutting of the strips to obtain a membrane electrode assembly of the desired length.

13 Claims, 1 Drawing Sheet

U.S. PATENT DOCUMENTS

| | | | | |
|---|---|---|---|---|
| 5,773,480 A | * | 6/1998 | Stone et al. | 521/27 |
| 5,824,199 A | * | 10/1998 | Simmons et al. | 204/262 |
| 5,834,523 A | * | 11/1998 | Steck et al. | 521/27 |
| 5,856,046 A | * | 1/1999 | Heilmann et al. | 429/233 |
| 5,863,673 A | * | 1/1999 | Campbell et al. | 429/44 |
| 5,910,378 A | * | 6/1999 | Debe et al. | 429/42 |
| 5,985,942 A | * | 11/1999 | Steck et al. | 521/27 |
| 6,060,190 A | * | 5/2000 | Campbell et al. | 429/40 |

* cited by examiner

PROCESS FOR MANUFACTURING A MEMBRANE ELECTRODE ASSEMBLY

CROSS-REFERENCE TO RELATED APPLICATIONS

This application is related to and claims priority benefits from U.S. Provisional Patent Application Ser. No. 60/288,351, filed May 3, 2001, entitled "Double Belt Bonding Process and Apparatus", and U.S. Provisional Patent Application Ser. No. 60/302,262, filed Jun. 29, 2001, entitled "Double Belt Bonding Process and Apparatus". Each of the '351 and '262 applications is hereby incorporated by reference herein in their entirety.

FIELD OF THE INVENTION

The present process relates to the manufacture of electrochemical fuel cells. More specifically, the present invention provides a double belt process and apparatus for bonding electrochemical fuel cell MEA materials comprising an ion exchange membrane material and at least one electrode substrate.

BACKGROUND OF THE INVENTION

Electrochemical fuel cells convert reactants, namely, fuel and oxidant fluid streams, to generate electric power and reaction products. Electrochemical fuel cells employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

Solid polymer fuel cells typically employ a membrane electrode assembly ("MEA") consisting of a solid polymer electrolyte or ion exchange membrane disposed between two electrode layers. The membrane, in addition to being ion conductive (typically proton conductive) material, also acts as a barrier for isolating the reactant streams from each other.

The advantages—both actual and potential—of electrochemical fuel cells are well documented. Until recently, however, high-volume fuel cell manufacturing processes have been relatively tangential concerns. The primary focus for fuel cell manufacturers has been (and, in many respects, will continue to be) to design and develop efficient fuel cells of consistent and high quality. Now, in addition to further research and development of fuel cells and their applications, manufacturers are focusing more attention on developing high-volume, commercial manufacturing processes.

Conventional methods for producing MEAs include reciprocal press bonding and roller bonding. Such methods are not particularly well suited to high-volume manufacturing processes, may not allow for a suitable degree of control over the bonding temperatures or pressures employed, or both.

SUMMARY OF THE INVENTION

In a process for the manufacture of an MEA for an electrochemical cell, an ion-exchange membrane material is bonded to at least one electrode substrate. In one embodiment, the present process comprises: feeding a sheet of ion exchange membrane material through a double belt press; feeding at least one electrode substrate through the double belt press; and applying heat and pressure to bond a portion of the membrane material and the electrode substrate(s) within a process zone of the double belt press. The present process can further comprise cutting the bonded MEA material to size.

In another embodiment, the present process further comprises receiving bonded material from the double belt press and longitudinal cutting of the bonded material to obtain at least one strip of bonded material. For example, the cutting steps can comprise longitudinal cutting to the desired width with a spring-loaded knife.

In another embodiment, the present process further comprises receiving bonded material from the double belt press and cross-cutting the bonded material. For example, mechanical cross-cutting to a desired length with a guillotine cutter can be employed.

In the foregoing embodiments, the process can further comprise a punching step wherein features such as manifold openings or rounded corners can be added to the MEA material. A variety of cutting processes can be employed in the present method to cut the bonded material to size, if desired, including mechanical cutting, laser cutting, high pressure water jet cutting and ultrasonic cutting.

The present double belt bonding process specifically contemplates bonding a continuous ion exchange membrane material sheet with one or two continuous electrode substrate sheets. The present process also contemplates feeding of discrete ion exchange membrane material sheets and/or electrode substrate sheets. Further, the process can also involve depositing, such as by extruding, sputtering or spraying, for example, one or more of the MEA components in powder, granulate, paste or liquid form onto at least one of the steel belts of a double belt press, and then forming the component layer(s) and bonding the MEA. Alternatively, at least one of the components can be deposited onto a sheet of another of the MEA components to be fed through the double belt press.

In one embodiment, the present apparatus comprises a double belt press and means for depositing a powder, granulate, paste or liquid MEA component mixture onto a material or onto one of the belts of the double belt press, wherein the material includes ion exchange membrane materials, electrode substrates and release films.

DETAILED DESCRIPTION OF PREFERRED EMBODIMENT(S)

Figure 1A:
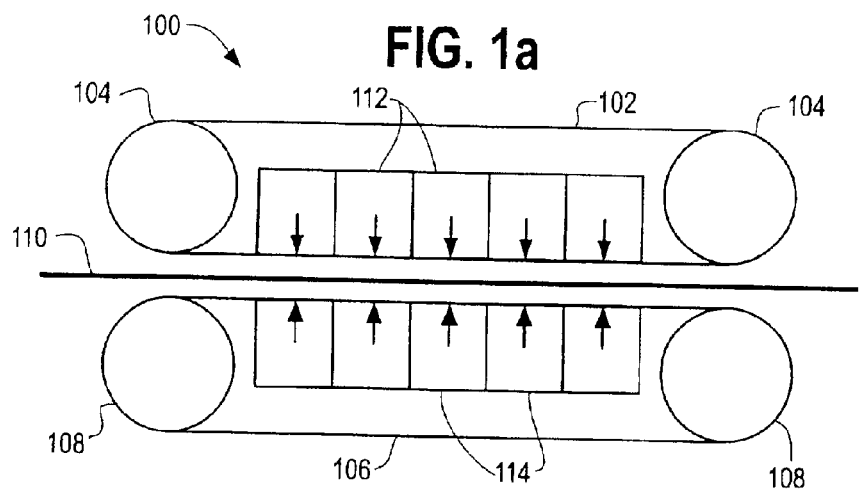
FIGS. 1a and 1b are schematic representations of an isochoric and an isobaric double belt press, respectively.

As mentioned above, conventional methods for producing MEAs include reciprocal press bonding and roller bonding.

Reciprocal press bonding typically employs a cycle press comprising two metal platens that apply pressure (and optionally heat) to materials that are pressed between them. The platens in a cycle press typically feature hard surfaces, and are made of metal. Reciprocal press bonding can be conducted as one-step heat bonding, one-step heat/cool bonding or two-step heat/cool bonding.

Reciprocal press bonding using a cycle press can be disadvantageous for high-volume manufacturing. For example, reciprocal press bonding is necessarily a discrete process. In other words, materials (such as an ion exchange membrane and an electrode(s)) cannot be continuously fed through a cycle press. When pressure and heat are applied to one or more of the materials, conveyance (that is, throughput) of the materials is temporarily stopped.

Another significant problem with reciprocal press bonding employing platens is that it is difficult or impossible to adjust the platens in response to variations in thickness of the materials to be bonded, and therefore provide or allow for sufficiently even application of temperature and pressure to the materials. For bonding relatively thin materials to create relatively thin structures such as MEAS, minor surface irregularities in the materials can result in significant variation(s) in the thickness of the MEA. Thus, even assuming a flat platen surface, the pressure exerted on the surface of the MEA during bonding can vary as thicker regions are compressed more than thinner regions. Further, heat applied to the electrode and the membrane can also vary across the surface of the MEA. As the temperature of the membrane increases, its viscosity will decrease (this also applies to electrodes where polymeric electrode materials are employed). The higher the temperature, the greater the effect on viscosity, particularly if the glass transition temperature of the material is reached or exceeded. Thus, when pressure is applied to a material, such as the ion exchange membrane, whose viscosity varies along its surface, that material may respond by flowing in a non-uniform manner. Stated another way, the softer a given (heated) section of the ion exchange membrane is, the more it may flow and be thinned out when pressure is applied. The uneven application of pressure can exacerbate that problem. If the ion exchange membrane flows so much during bonding that the electrodes come into contact, a significant problem, namely electrical shorting of the MEA, can occur. Such resulting uneven thickness of the ion exchange membrane in the finished MEA can also lead to such problems as variations in ionic conductance across the membrane surface and/or unacceptable variations in the electrical resistance of the MEA.

Membrane presses, which are a variation of cycle presses, have also been employed in reciprocal press bonding processes. Membrane presses feature soft cushions, instead of platens with hard surfaces. Conventional membrane presses have the same shortcomings as cycle presses in that they are operated in a discrete manner. In addition, at least with respect to the current state of the art, conventional membrane presses are often unable to apply the amounts of pressure that are necessary or desirable in many manufacturing processes, including processes for bonding MEA materials.

Roller bonding is reasonably well suited to mass production, and can be employed in discrete or continuous processes. Steel and rubber roll bonding or flexo-roll bonding can be employed, and can include applying heat to the materials to be bonded.

As opposed to reciprocal press bonding, which involves the application of a surface pressure to the materials to be bonded, roller bonding involves the application of line pressure to the materials as they pass through the nip of the rollers.

Roller bonding, like reciprocal press bonding, can also be disadvantageous for high-volume manufacturing of MEAs. For example, it has been found that the bonding of the MEA components is unsatisfactory using roller pressure alone. Further, when heat is also applied, deformation of the ion exchange membrane around the rollers can result in variations in the thickness of the ion exchange material within the MEA. Those variations in thickness can, in turn, permit contact between the electrodes, which contact could result in an electrical short.

The present process and apparatus employ a double belt press for bonding electrochemical fuel cell MEA materials comprising an ion exchange membrane material and at least one porous, electrically-conductive electrode substrate. Indeed, the present process and apparatus can be employed to bond MEA materials for other electrochemical cells, as well.

Suitable ion exchange membrane materials include, for example, perfluorosulfonic acid ionomers, perfluorocarboxylic acid ionomers, styrenic polymers, and mixtures thereof. An example of a suitable perfluorosulfonic acid ionomer is Nafion® (E.I. DuPont de Nemours, Inc., Wilmington, Del., US), a commercially available perfluorosulfonic acid copolymer. Suitable styrenic polymers include substituted and unsubstituted fluorinated styrenes, such as $\alpha$-fluorostyrenes, $\alpha,\beta$-difluorostyrenes and $\alpha,\alpha,\beta$-trifluorostyrenes. Examples of suitable styrenic polymers are described in commonly assigned U.S. Pat. Nos. 5,498,639, 5,602,185, 5,684,192, 5,773,480, 5,834,523 and 5,985,942, each of which is hereby incorporated by reference herein in its entirety.

The ion exchange membrane material can comprise a dense film, a composite ion exchange membrane comprising a porous substrate impregnated with an ion exchange material, or a laminate of dense films, composite membranes or both. The ion exchange membrane material can further comprise a catalyst layer comprising an electrocatalyst on either or both surfaces thereof. The ion exchange membrane material can be flexible and otherwise suitable for processing in a reel-to-reel type process. Generally, the thickness of ion exchange membrane material in an MEA is in the range of about 10–200 $\mu$m.

Suitable porous, electrically conductive materials (that is, electrode substrates) include woven materials, non-woven materials and meshes (as used herein, "mesh" refers to a continuous sheet of substantially non-porous material that has been perforated) The materials can comprise metals or metal oxides, polymers, glass fiber, or carbon. The electrode substrate can also be flexible and otherwise suitable for processing in a reel-to-reel type process. Generally, the thickness of an electrode in an MEA is in the range of about 50–300 $\mu$m.

Carbon wovens, non-wovens and meshes can comprise graphitic and carbon materials, such as carbon fiber materials, for example. Examples of commercially available graphitic and non-graphitic carbon fiber non-woven materials include: Toray TGP-H-060 carbon fiber paper (Toray, Tokyo, Japan); Optimat 203 (Technical Fibre Products, Kendal, UK); Sigratex™ non-wovens (SGL Carbon GmbH, Wiesbaden, Germany); and, LyFlex™ products (Lydall, Inc., Manchester, Conn., USA). Examples of suitable carbon fiber woven materials include: Torayca fabric (Toray, Tokyo, Japan); Sigratex™ fabrics (SGL Carbon GmbH, Wiesbaden, Germany); and Panex™ products (Zoltec Companies, Inc, St. Louis, Mo., USA).

Each electrode in an MEA has a catalyst layer, comprising an appropriate electrocatalyst for facilitating the desired electrochemical reaction of the fuel and oxidant, located adjacent the ion exchange membrane material. The electrocatalyst can, for example, be a metal black, an alloy or a supported metal catalyst such as platinum on carbon. The catalyst layer typically contains ionomer that can be similar to that employed for the ion exchange membrane (for example, Nafion®). The catalyst layer can also contain a binder, such as polytetrafluoroethylene.

The electrodes can also contain a sublayer (typically containing an electrically conductive particulate material such as carbon black, for example) between the catalyst layer and the electrode substrate. A sublayer can be employed to modify certain properties of the electrode (for example, interface resistance between the catalyst layer and the substrate).

Electrodes for an MEA can be prepared by first applying a sublayer, if desired, to a suitable electrode substrate, and then applying the catalyst layer onto the sublayer. These layers can be applied in the form of slurries or inks that contain particulates and dissolved solids mixed in a suitable liquid carrier, for example, or as granulate mixtures or pastes. Alternatively, catalyst layers can first be applied to the ion exchange membrane material with optional sublayers and substrates incorporated thereafter, either on the catalyzed membrane material or electrode substrate.

As used herein and in the appended claims, "electrode substrate" refers to an electrode substrate with or without a catalyst layer and/or supporting sublayer.

The double belt press is a commercially available device. Metso Paper, Inc. (Jyväskylä, Finland) is a manufacturer of such devices, as is Hymmen International, Inc. (Duluth, Ga., USA). Other manufacturers include Dieffenbacher GmbH & Co. (Eppingen, Germany), Sandvik Process Systems GmbH (Fellbach, Germany), and Siempelkamp LP (Marietta, Ga., USA). Isobaric and isochoric double belt presses can be employed in the present process.

The double belt press typically utilizes belts made of steel. An upper belt and lower belt run about a pair of upper and lower drums, respectively. The material to be bonded is fed between the steel belts. At least one processing zone is located between the belts in the region between the pairs of drums.

Isobaric double belt presses apply an even pressure over the surface area of the reaction area by means of flexible fluid cushions that exert a pressure on the steel belts. The pressurizing fluid can, for example, comprise a gas, such as air, or a liquid, such as oil. At higher pressures, the risk of leakage of a suitable gas (such as air) is greater than the risk of leakage of a suitable liquid (such as oil). Thus, at higher pressures it may be preferable for the cushions to be filled with a suitable liquid. If a liquid filled cushion is employed in the present process (for example, an oil-filled cushion), it may be necessary or desirable to take steps to avoid discharge or spillage of liquid or liquid mist that could contaminate the MEA material.

Isochoric (that is, equal volume) double belt presses include gliding and roller bed double belt presses. Isochoric double belt presses maintain a constant volume within the processing zone by, for example, using sets of rollers supporting each belt.

Figure 1B:
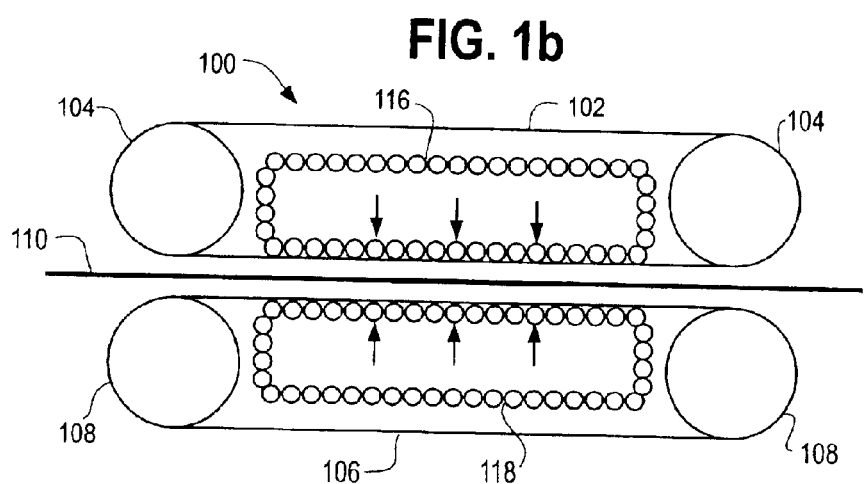

Isobaric and isochoric double belt presses can be employed in the present process. FIGS. 1a and 1b are schematic representations of an isobaric and an isochoric double belt press, respectively. In isobaric double belt press 100 and isochoric double belt press 100', upper belt 102 runs about upper drums 104, and lower belt 106 runs about lower drums 108. Material 110 is fed between belts 102 and 106. It is to be understood that material 110 can comprise at least two layers to be bonded. In press 100, upper fluid cushions 112 and lower fluid cushions 114 exert a pressure against upper and lower belts 102 and 106, respectively, and the belts in turn apply a pressure to the portion of material 110 in contact with them. The region between upper and lower fluid cushions 112 and 114 defines the process zone for press 100. In press 100', upper and lower roller beds 116 and 118 exert a force on upper and lower belts 102 and 106, respectively, and maintain a constant volume in the region therebetween, which is the processing zone of press 100'. Both fluid cushions 112 and 114, and roller beds 116 and 118, can also be heated/cooled so as to apply a predetermined temperature within the processing zone.

The processing zone(s) in the double belt press can also apply heat during bonding. Indeed, temperature and/or pressure gradients can be established by a series of processing zones, as desired. For example, in press 100 of FIG. 1a, each opposing pair of fluid cushions 112 and 114 could apply a different temperature and/or pressure during bonding, thereby defining different processing zones. The length of the processing zone(s) together with the belt speed determines the process or bonding time for the materials as they pass through the double belt press.

The width of the MEA components to be bonded can be the same as the width of the steel belts, in which case the MEA materials at the edges will typically not be processed within the processing zone, resulting in some waste material in the bonded MEA. Alternatively, the width of the steel belts can be greater than the width of the MEA components, and one or both belts can comprise a recess for receiving the MEA components, in which case the MEA materials will be processed in the processing zone and the amount of waste material at the edges of the bonded MEA can be reduced or minimized.

The ion exchange membrane material and at least one electrode substrate are fed through the double belt press. Where two electrode substrates are fed through the press with the ion exchange membrane material, of course the ion exchange membrane material is interposed between them. The MEA components adjacent the belts can have a release film on the surface in contact with the belts so as to avoid direct contact with the steel belts, if desired. Alternatively, the belts could be coated with a suitable non-stick material, such as Teflon®.

Each steel belt in the double belt press contacts one of the MEA components, applying temperature and pressure to the portion of the MEA components within the processing zone. The temperature and pressure to be applied can be programmable and capable of being monitored and recorded.

The appropriate temperature and pressure within the processing zone depends on, among other factors, the belt speed of the double belt press and the composition of the MEA components to be bonded. The pressure applied to the MEA components should be sufficient to ensure adequate bonding between them while avoiding crushing or otherwise damaging them.

An elevated temperature can be selected, if desired, to assist in forming an adequate bond between the MEA components. For example, the temperature in the processing zone can be selected to heat the ion exchange membrane material to a temperature at or above its glass transition temperature (or optionally to heat the electrode substrate(s) to or above its glass transition temperature, where this temperature is lower than the glass transition temperature of the ion exchange membrane material). It is advisable to avoid heating the MEA components above their respective melt temperatures.

The pressure and/or temperature within the processing zone can also be varied, if desired. For example, the processing zone can comprise a first heated zone for heating the ion exchange membrane material to a temperature at or above its glass transition temperature, for example, and a second cooler zone for cooling the MEA before exiting the double belt press. At the same time, the pressure exerted in the processing zone could also be varied to take into account, for example, the flowability of the MEA components at different temperatures.

Suitable pressures and temperatures are also affected by the belt speed of the double belt press. In principle, higher bonding pressures can permit faster belt speeds while maintaining adequate bonding of the MEA materials. Similarly, higher bonding temperatures can also permit faster belt speeds. The appropriate process parameters for a given application will depend on such factors as the composition of the MEA components to be bonded and the desired throughput capacity of the process, for example, and can readily be determined by persons skilled in the art.

The ion exchange membrane material, the electrode substrate(s), or both can be fed through the double belt press as a continuous sheet, typically from a roll. Alternatively, either or both MEA components can be fed through the double belt press as discrete sheets.

The present process can further comprise applying a catalyst mixture to the ion exchange membrane material and/or electrode substrate(s) and forming the catalyst layer (s) at the same time the MEA is bonded. For example, a catalyst mixture could be applied as a powder, granulate composition, paste or slurry, and the catalyst layer could be formed by the application of pressure, and optionally heat, to the catalyst mixture in the double belt press. Similarly, a sublayer mixture could also be applied to an electrode substrate and the sublayer formed in the double belt press.

Another embodiment of the present process comprises depositing, such as by extruding, sputtering or spraying, for example, one or more of the MEA components in granulate, paste or liquid form onto at least one of the steel belts of a double belt press, and then forming the component layer(s) and bonding the MEA. Alternatively, at least one of the components can be deposited onto a sheet of another of the MEA components to be fed through the double belt press.

Once the MEA material has been bonded, a variety of cutting processes can be employed to cut the bonded material to size, including mechanical cutting, laser cutting, high pressure water jet cutting and ultrasonic cutting, for example. The latter two processes can efficiently cut the bonded material though disposal treatment of the cutting medium becomes necessary or desirable. Laser cutting can also efficiently cut the bonded material although care should be taken to avoid membrane retraction, which can cause short circuits along the edges when under stack compression.

Mechanical cutting processes generally fall within two classes: shear cutting or squeeze cutting. The apparatus employed for shear cutting includes, but is not limited to, such tools as a solid knife, spring loaded knife, flat punching tool, steel rule die or guillotine cutter. Typical tools for squeeze cutting include, for example, a rotary tool, squeeze knife, flexible rotary die, flexible flat die or rotary die.

In another embodiment of the present process, the bonded material is cut to size in at least two steps. In the first step, bonded material is slit to the appropriate width by at least one cutting shear in which a top male blade (the upper knife) is supported by a lower female ring (the lower knife), both of which rotate about their axis to longitudinally cut the bonded material. In the second step, the strips are cross-cut to the desired length. The cross-cutting step can be accomplished, with for example a guillotine cutter.

An optional step can comprise forming additional desired features in the bonded material such as rounded corners, or internal manifold openings, for example. Punch cutting or other suitable methods, as desired could form the features. The features can be added before, after or concurrently with the cross-cutting step.

The forgoing embodiment potentially allows for a waste-free cut, allows for high volume and high quality cutting of the MEA material, and it is easily amenable to changing the dimensions of the final MEA, either the length or width or both.

In one embodiment, the present apparatus comprises a double belt press and means for depositing a powder, granulate, paste or liquid MEA component mixture onto a roll of material or onto one of the belts of the double belt press. Suitable means for depositing the mixture will be apparent to persons skilled in the art, and include hopper feeders, extruders, sprayers, coaters and vapor phase deposition devices, for example. The depositing means could also be employed to apply a catalyst or sublayer mixture to one or both of the MEA components in sheet form, if desired.

Figure 2:
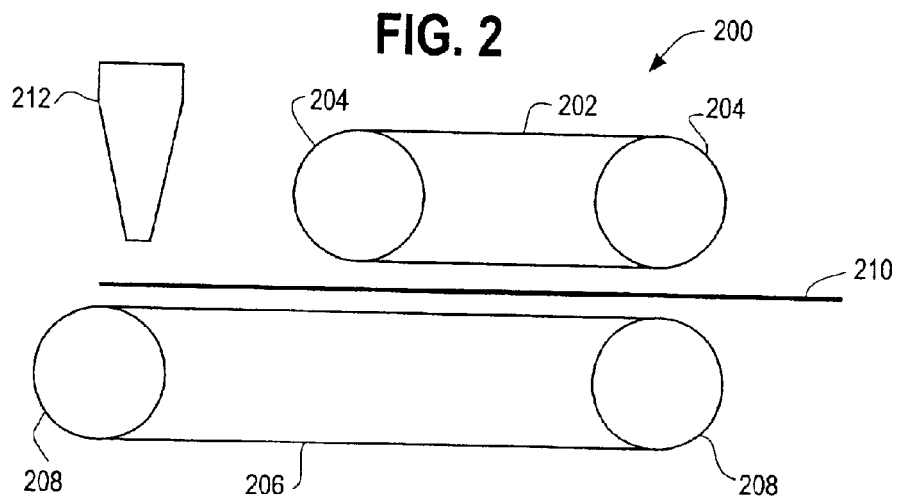
FIG. 2 is a schematic representation of an apparatus suitable for use in an embodiment of the present process.

The double belt press can be an isobaric or isochoric double belt press. For example, FIG. 2 is a schematic representation of a double belt press incorporating a device for depositing an MEA component mixture onto the lower belt of the press. In press 200, upper belt 202 runs about upper drums 204, and lower belt 206 runs about lower drums 208. Press 200 can be an isobaric or isochoric double belt press, as desired. Material 210 is fed between belts 202 and 206. Feeder 212 deposits an MEA component mixture onto material 210. Feeder 212 can comprise a hopper for depositing a granulate mixture or an extruder for depositing a paste, for example. Other suitable devices will be apparent to persons skilled in the art. Material 210 can comprise a sheet of MEA component material, or a release film (as described above). Alternatively, feeder 212 could deposit the mixture directly onto lower belt 206. Note that in press 200 the process zone is defined by the region between upper drums 204.

The present apparatus can further comprise web-handling equipment for feeding the MEA components to the double belt press and/or for receiving the MEA. In general, the present apparatus is not limited to particular web handling equipment, and can employ suitable web handling equipment. Suitable web handling equipment for a given application will be apparent to persons skilled in the art.

Compared to conventional processes, the present process and apparatus has one or more of the following advantages. The present process and apparatus can achieve more even distribution of pressure, temperature and other forces over the surface of the MEA during bonding, particularly where an isobaric double belt press is employed, even if there are variations in thickness of the MEA components. For example, the present process and apparatus can provide for bonding of MEA components where the temperature variation within the processing zone of the double belt press (and thus across the surface area of the MEA components therein) does not vary by more than about 5° C. By comparison, reciprocal press bonding processes typically feature temperatures that vary by twice as much (that is, by 10° C. or more). Further, a more even application of pressure across the surface of the MEA components to be bonded assists in forming a more homogeneous bond between the MEA components.

The present process and apparatus can be more forgiving of material thickness variations than other available processes, such as reciprocal press bonding or line pressure bonding processes employing rollers. The present process and apparatus can also result in a more even distribution of other forces, such as tensile forces, through MEA components fed to the double belt press in continuous sheets.

The present process can also be more efficient with respect to product yield, materials use, labor, and use of factory floor space, among other things.

While particular steps, elements, embodiments and applications of the present invention have been shown and described, it will be understood, of course, that the invention is not limited thereto since modifications can be made by persons skilled in the art, particularly in light of the foregoing teachings. It is therefore contemplated by the appended claims to cover such modifications as incorporate those steps or elements that come within the scope of the invention.

What is claimed is:

1. A process for manufacturing a membrane electrode assembly for an electrochemical cell, comprising:
   feeding a sheet of ion exchange membrane material through a double belt press, the ion exchange membrane material being heated to at least a glass transition temperature in the first zone and the temperature in the second zone being below the glass transition temperature;
   feeding an electrode substrate through the double belt press, the double belt press having first and second process zones, and at least one of the temperature and the pressure in the first and second process zones being different; and
   applying heat and pressure to bond a portion of the membrane material and the electrode substrate within a process zone of the double belt press.

2. A process for manufacturing a membrane electrode assembly for an electrochemical cell, comprising:
   feeding a sheet of ion exchange membrane material through a double belt press;
   feeding an electrode substrate through the double belt press; and
   applying heat and pressure to bond a portion of the membrane material and the electrode substrate within a process zone of the double belt press; wherein a sublayer mixture is applied to the electrode substrate before feeding the electrode substrate to the double belt press.

3. A process for manufacturing a membrane electrode assembly for an electrochemical cell, comprising:
   feeding a sheet of ion exchange membrane material through a double belt press;
   feeding an electrode substrate through the double belt press;
   applying heat and pressure to bond a portion of the membrane material and the electrode substrate within a process zone of the double belt press; and
   wherein a release film is fed through the double belt press in contact with a belt thereof.

4. A process for manufacturing a membrane electrode assembly for an electrochemical cell, comprising:
   feeding a sheet of ion exchange membrane material through a double belt press;
   feeding an electrode substrate through the double belt press; and
   applying heat and pressure to bond a portion of the membrane material and the electrode substrate within a process zone of the double belt press;
   wherein at least one belt of the double belt press is coated with a non-stick material.

5. A process for manufacturing a membrane electrode assembly for an electrochemical cell, comprising:
   feeding a sheet of ion exchange membrane material through a double belt press;
   feeding an electrode substrate through the double belt press;
   applying heat and pressure to bond a portion of the membrane material and the electrode substrate within a process zone of the double belt press;
   receiving the bonded material from the double belt press; and
   punching features in the bonded material.

6. A process for manufacturing a membrane electrode assembly for an electrochemical cell, comprising:
   feeding a sheet of ion exchange membrane material through a double belt press;
   feeding an electrode substrate through the double belt press;
   applying heat and pressure to bond a portion of the membrane material and the electrode substrate within a process zone of the double belt press;
   receiving the bonded material from the double belt press; and
   longitudinally cutting the bonded material to obtain a strip of bonded material.

7. The process of claim 6 wherein the longitudinal cutting is performed with a spring-loaded knife.

8. The process of 6 further comprising punching features in the bonded material.

9. A process for manufacturing a membrane electrode assembly for an electrochemical cell, comprising:
   feeding a sheet of ion exchange membrane material through a double belt press;
   feeding an electrode substrate through the double belt press;
   applying heat and pressure to bond a portion of the membrane material and the electrode substrate within a process zone of the double belt press; and
   receiving the bonded material from the double belt press; and
   cross-cutting the bonded material.

10. The process of claim 9 wherein the cross-cutting is performed with a guillotine cutter.

11. The process of 9 further comprising punching features in the bonded material.

12. A process for manufacturing a membrane electrode assembly for an electrochemical cell, comprising:
    feeding a sheet of ion exchange membrane material through a double belt press;
    feeding an electrode substrate through the double belt press;
    applying heat and pressure to bond a portion of the membrane material and the electrode substrate within a process zone of the double belt press; and
    receiving the bonded material from the double belt press; and
    cross-cutting the bonded material.

13. The process of 12 further comprising punching features in the bonded material.

* * * * *